United States Patent
Xu

(10) Patent No.: US 12,389,303 B2
(45) Date of Patent: Aug. 12, 2025

(54) OFFLINE MESH MESSAGING NETWORK WITH BLUETOOTH BROADCASTING

(71) Applicant: WhatsApp LLC, Menlo Park, CA (US)

(72) Inventor: Shipeng Xu, Union City, CA (US)

(73) Assignee: WhatsApp, LLC, Menlo Park, CA (US)

( * ) Notice: Subject to any disclaimer, the term of this patent is extended or adjusted under 35 U.S.C. 154(b) by 502 days.

(21) Appl. No.: 17/716,254

(22) Filed: Apr. 8, 2022

(65) Prior Publication Data

US 2023/0328621 A1    Oct. 12, 2023

(51) Int. Cl.

| | |
|---|---|
| H04W 40/00 | (2009.01) |
| H04W 4/02 | (2018.01) |
| H04W 4/80 | (2018.01) |
| H04W 12/033 | (2021.01) |
| H04W 40/02 | (2009.01) |
| H04W 40/06 | (2009.01) |
| H04W 40/20 | (2009.01) |
| H04W 84/18 | (2009.01) |

(52) U.S. Cl.
CPC .......... *H04W 40/06* (2013.01); *H04W 4/023* (2013.01); *H04W 4/80* (2018.02); *H04W 12/033* (2021.01); *H04W 40/02* (2013.01); *H04W 40/20* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,647,428 B1 * | 11/2003 | Bannai | H04L 45/00 709/236 |
| 9,439,129 B2 * | 9/2016 | McNamee | H04L 51/18 |
| 9,608,912 B2 | 3/2017 | Thubert et al. | |
| 10,404,572 B1 * | 9/2019 | Fuste Vilella | H04W 40/00 |
| 10,462,661 B2 | 10/2019 | Kwon et al. | |
| 10,826,851 B2 | 11/2020 | Ergen | |
| 10,834,035 B2 | 11/2020 | Aneja et al. | |

(Continued)

FOREIGN PATENT DOCUMENTS

CN    115348568 A    * 11/2022

OTHER PUBLICATIONS

EPO—International Search Report and Written Opinion for related International Application No. PCT/US2023/017826, mailed Jul. 12, 2023, 11 pages.

(Continued)

*Primary Examiner* — Gerald A Smarth
(74) *Attorney, Agent, or Firm* — Eversheds Sutherland (US) LLP

(57) ABSTRACT

Methods, systems, and storage media for relaying a message through an offline mesh network are disclosed. Exemplary implementations may: relay messages by changing device names within a network; generate, at an initial node, an encoded message comprising a payload, an account identifier for the initial node, and an account identifier for the destination node; relay the encoded message through one or more intermediary nodes; determine, by each of the one or more intermediary nodes, whether device names in the vicinity are encoded messages and; in response to the determining, deliver the encoded message to the destination node; and cause display of the encoded message through the destination node.

20 Claims, 6 Drawing Sheets

(56) References Cited

U.S. PATENT DOCUMENTS

| | | | |
|---|---|---|---|
| 2015/0188991 A1* | 7/2015 | Huang | H04L 67/10 709/217 |
| 2018/0014241 A1* | 1/2018 | Perdomo | H04L 67/52 |
| 2018/0220353 A1 | 8/2018 | Mendiola et al. | |
| 2019/0207819 A1* | 7/2019 | Sathya | H04W 84/18 |
| 2019/0238338 A1 | 8/2019 | O'Brien et al. | |

OTHER PUBLICATIONS

Linton A., "End-to-End Encryption: Secure Messengers and Messaging," Apr. 26, 2021, 5 pages, Retrieved from the Internet: URL: https://getsession.org/blog/end-to-end-encryption-secure-messengers-and-messaging.

* cited by examiner

OFFLINE MESH MESSAGING NETWORK WITH BLUETOOTH BROADCASTING

TECHNICAL FIELD

The present disclosure generally relates to relaying a message through an offline mesh network, and more particularly to mesh messaging network with bluetooth broadcasting.

BACKGROUND

Conventionally, when mobile devices lose connectivity to communication networks, they are considered "offline" and are unable to successfully send or receive messages. This may happen, for example, during an emergency such as a storm or natural disaster where conventional communication through the Internet may become unavailable. Communication is often of critical importance during these times, yet existing systems provide no backup or alternative methods for users to send and receive communications when their mobile devices go offline. While some devices have the capability of connecting with limited user bluetooth network systems for locating other specific bluetooth devices, these systems do not relay messages from one device to another. These systems are merely capable of determining the approximate physical location of a lost device, not sending that device a message. This leaves users of offline mobile devices stuck without an option for sending or receiving messages when a communication network goes down and the need for communication may be vital to their safety and security.

BRIEF SUMMARY

The subject disclosure provides for systems and methods for relaying a message through an offline mesh network. A user may send messages via an offline device to a recipient device through intermediary devices in a mesh network. For example, in a disaster or emergency, a device may lose connectivity to the Internet and wireless communication networks. Using systems and methods disclosed herein, the offline device may broadcast a message that is re-broadcast by intermediary devices until it reaches the recipient device.

One aspect of the present disclosure relates to a method for relaying a message through an offline mesh network. The method may include generating, at an initial node, a message including a payload, an account identifier for the initial node, and an account identifier for the destination node. The method may include relaying the message through one or more intermediary nodes. The method may include determining, by each of the one or more intermediary nodes, whether the destination node matches any of the one or more intermediary nodes. The method may include, in response to the determining, delivering the message to the destination node. The method may include causing display of the message through the destination node.

Another aspect of the present disclosure relates to a system configured for relaying a message through an offline mesh network. The system may include one or more hardware processors configured by machine-readable instructions. The processor(s) may be configured to generate, at an initial node, a message including a payload, an account identifier for the initial node, and an account identifier for the destination node. The processor(s) may be configured to relay the message through one or more intermediary nodes via bluetooth technology. The processor(s) may be configured to determine, by each of the one or more intermediary nodes, whether the destination node matches any of the one or more intermediary nodes. The processor(s) may be configured to, in response to the determining, deliver the message to the destination node. The processor(s) may be configured to cause display of the message through the destination node.

Yet another aspect of the present disclosure relates to a non-transient computer-readable storage medium having instructions embodied thereon, the instructions being executable by one or more processors to perform a method for relaying a message through an offline mesh network. The method may include generating, at an initial node, a message including a payload, an account identifier for the initial node, and an account identifier for the destination node. The method may include relaying the message through one or more intermediary nodes via bluetooth technology. The method may include determining, by each of the one or more intermediary nodes, whether the destination node matches any of the one or more intermediary nodes. The method may include, in response to the determining, delivering the message to the destination node. The method may include causing display of the message through the destination node.

Still another aspect of the present disclosure relates to a system configured for relaying a message through an offline mesh network. The system may include means for generating, at an initial node, a message including a payload, an account identifier for the initial node, and an account identifier for the destination node. The system may include means for relaying the message through one or more intermediary nodes. The system may include means for determining, by each of the one or more intermediary nodes, whether the destination node matches any of the one or more intermediary nodes. The system may include means for, in response to the determining, delivering the message to the destination node. The system may include means for causing display of the message through the destination node.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
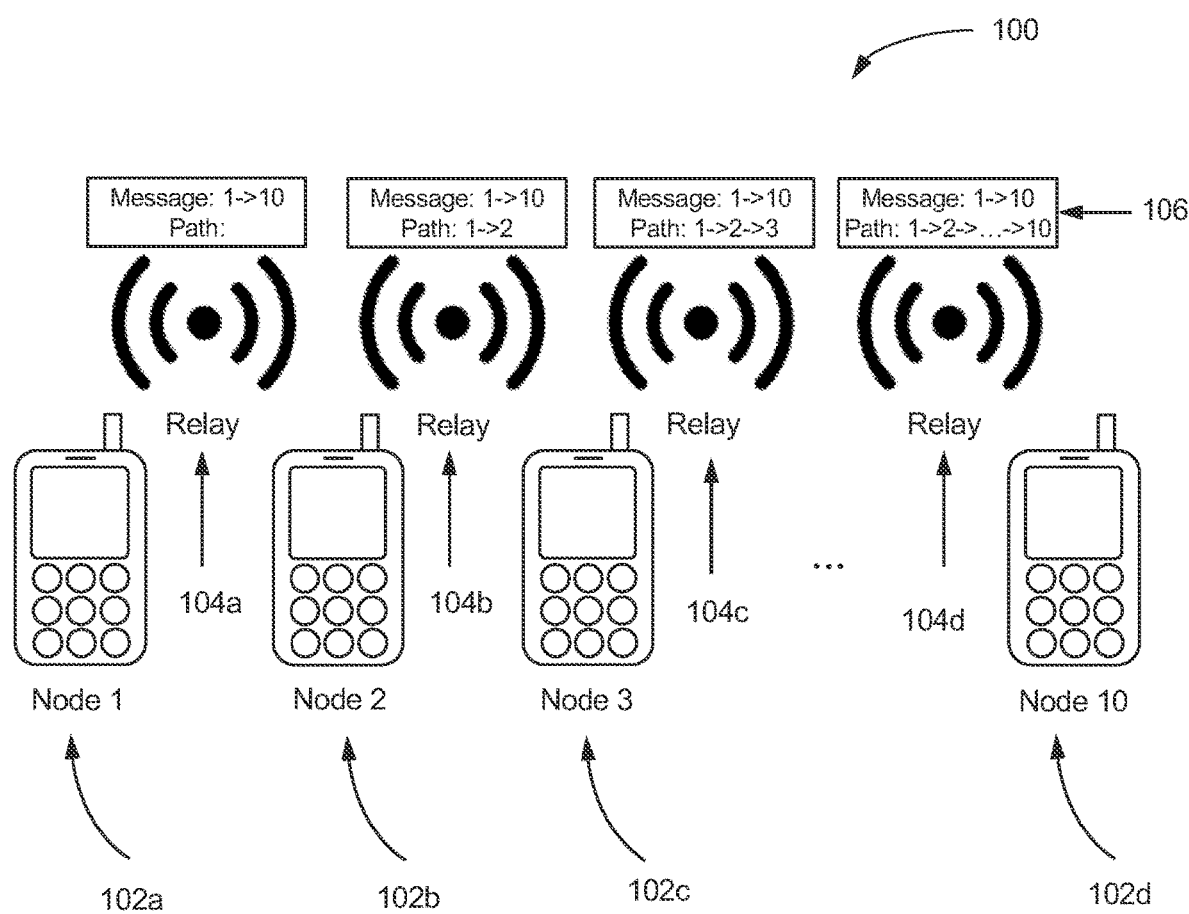
FIG. 1 illustrates example offline mesh messages broadcasted via bluetooth transmissions between multiple nodes of a network, in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In existing messaging networks, when a mobile device loses connectivity to a communications network and goes offline, the device is unable to successfully send or receive messages until it regains connectivity to the network. For a variety of reasons, it is desirable for these users to be able to send and receive messages when their devices go offline.

The subject disclosure provides for systems and methods for relaying a message through an offline mesh network. A user may send messages via an offline device to a recipient device through intermediary devices in a mesh network. For example, in a disaster or emergency, a device may lose connectivity to the Internet and wireless communication networks. Using systems and methods disclosed herein, the offline device may broadcast a message that is re-broadcast by intermediary devices until it reaches the recipient device.

Implementations described herein address the aforementioned shortcomings and other shortcomings by providing a computer-implemented method for relaying a message through an offline mesh network, wherein users are able to send and receive messages when their devices go offline. Implementations include systems for relaying a message from an initial node to a destination node through one or more intermediary nodes.

The subject disclosure provides for systems and methods of utilizing devices acting as intermediary relay nodes to create a communication path from an initial node to a destination node. In some implementations, an initial node may broadcast the message, for example, via bluetooth transmission to nearby intermediary nodes within communication range. The one or more intermediary nodes may then check to see if the message is intended for them. If the one or more intermediary nodes determines the message is not intended for them, they will again broadcast the message to nearby nodes within communication range. Any nodes receiving the message for a second time will filter out the message. This pattern will be repeated until the message reaches the destination device, a certain number of forwarding nodes is reached, or a certain time limit is reached. In this way, an initial node may utilize nodes in an offline network to send a message to a recipient node.

In some implementations, a device name may be used to send and receive messages. For example, a message may be encoded in a bluetooth device name, or the like. The encoded message may include the sender identifier, receiver identifier, message payload, or the like. In operation, an encoded message may be broadcast by an offline device and the destination node may be operable to receive the message and determine whether it is the destination of the message.

Before the encoded message reaches the destination node, the message may be relayed by one or more intermediary nodes, or the like, and each intermediary node may not recognize whether it is the destination. Only the destination node may determine whether it is the destination of the message.

In some implementations, a bluetooth name of one or more devices within a mesh network may be changed so that each of the one or more devices can use the bluetooth name to broadcast messages. When an initial node sends a message through intermediary nodes, the bluetooth device name of the initial node may be changed to a string that encodes information. The information may include, for example, a sender id, receiver id, message payload, or the like. A bluetooth device name may generally be limited to a maximum of 248 bytes. If the encoded content is too long for the bluetooth device name, the message may be split into multiple smaller chunks. The intermediary nodes may periodically scan the device names in their vicinity and check if any of the device names are encoded messages. If encoded messages are detected, the intermediary node may check if the message is meant for itself by comparing the receiver id from encoded message with its own id. If the receiver id matches the id of the intermediary node, the message will be considered to be sent to the destination successfully. In some implementations, a node can broadcast an ACK message through its bluetooth device name to confirm the message was sent to the destination successfully. If the receiver id does not match the id of the intermediary node, the message may be broadcasted again from the intermediary node through its bluetooth device name. The process may be repeated until destination node determines that the receiver id matches its own id, or the like.

In some implementations, an intermediary node may be connected to a communications network such as the Internet, a wireless communication network, or the like. In this example, when the message is forwarded to the connected intermediary node, it may send the message through the connected communications network to a recipient. When a communication is successfully received, the system can determine an optimal path of communication from the initial node to the connected intermediary node and ultimately to the destination. If the destination node sends a message back to the initial node, the system may send the message though the same communications path and the same When a return message is sent, the node that has communication network access can forward the message along the same path for efficiency, or it may be forwarded using a different path if conditions change.

FIG. 1 illustrates example offline mesh messages broadcasted via bluetooth transmissions 104*a-d* between multiple nodes 102*a-d* of a network 100, in accordance with one or more implementations. In the implementation depicted, an initial node ("Node 1") 102*a* does not have connectivity to the Internet or a cellular communications network. A destination node ("Node 10") 102*d* is specified at the initial node 102*a*. The message is then broadcast and relayed via bluetooth transmissions 104*a-d*, or the like, to the destination node 102*d*, through intermediary nodes ("Node 2" and "Node 3") 102*b*, 102*c*. When the initial node 102*a* sends a message, each time the message is relayed between the nodes 102*a*-102*d*, the message may be appended with a communication path 106 including the name or an identification of each node 10*a-d* that relayed the message along the way to the destination node 102*d*. If the destination node 102d sends a return message to the initial node 102a, the same path 106 may be utilized for efficiency, or a different path may be used.

In the example depicted in FIG. 1, after the initial node 102a specifies a destination node 102d, the message may be broadcast by the initial node 102a to any compatible devices within communication range via bluetooth transmission 104a, or the like. Intermediary node 102b may receive the message, determine that it has not been specified as the destination node 102d, and broadcast the message to other devices again within communication range via bluetooth transmission 104b, or the like. If the initial node 102a receives the sane message back, it filters out the communication to prevent receiving duplicate copies of the same message. Each of the intermediary nodes 102b, 102c also may be adapted to filter out duplicate messages. Intermediary node 102c may then receive the message and, after determining it is not the specified destination node 102d, broadcast the message again. This procedure may be followed by the intermediary nodes through additional bluetooth transmissions 104c, 104d until the message reaches the destination node 102d. In some implementations, a threshold number of intermediary nodes or a time limit may be selected, and if the number or time limit is reached, the message will no longer be forwarded. In some implementations, the initial node 102a will be notified via a return receipt, or the like, whether the message was successfully delivered or read at the destination node 102d. Although the bluetooth transmissions are indicated herein, it is contemplated that various implementations may use other methods of wireless communication, including Wi-Fi, or the like.

Figure 2:
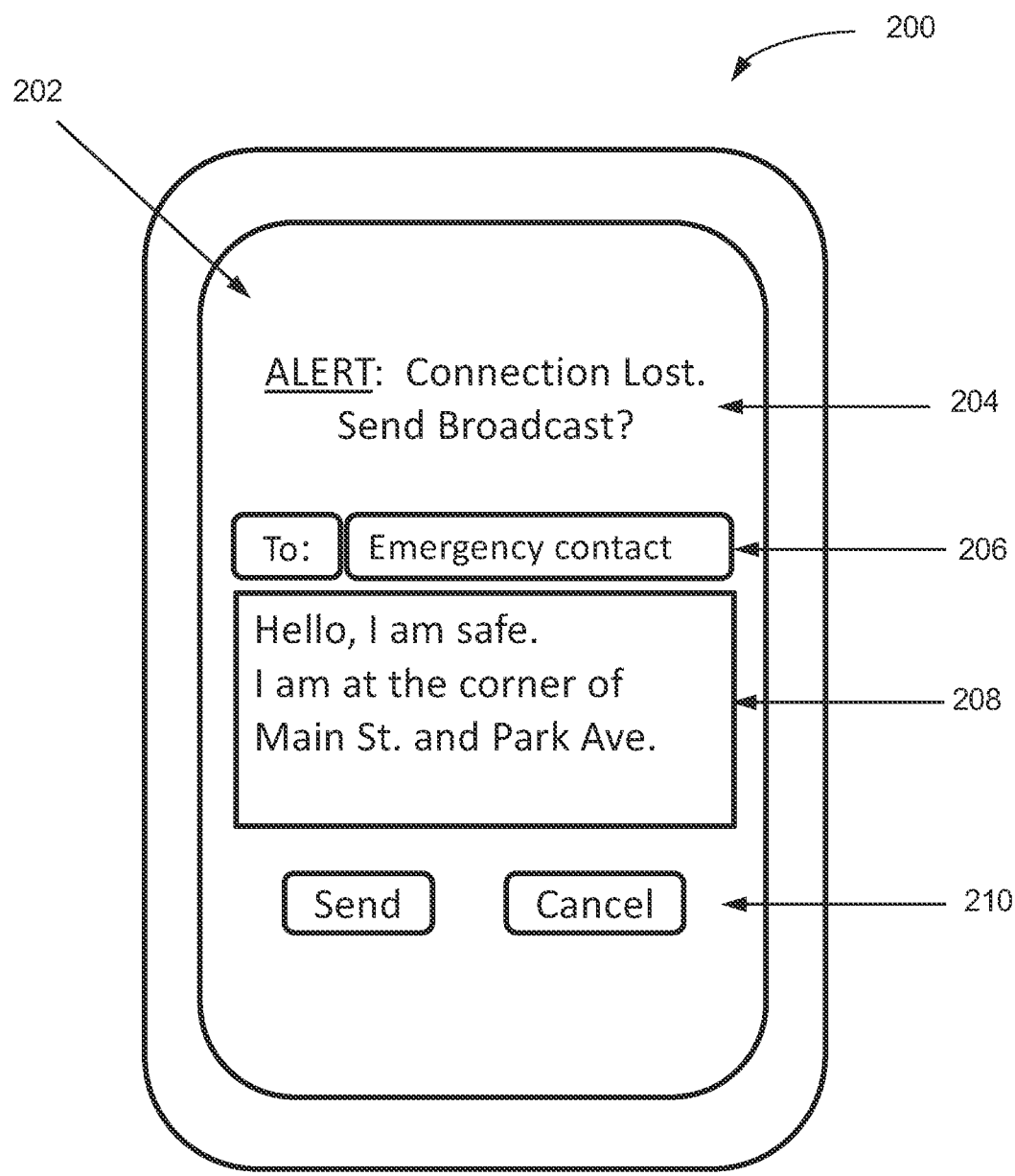
FIG. 2 illustrates an example user interface (UI) for relaying a message from an initial node through an offline mesh network, in accordance with one or more implementations.

FIG. 2 illustrates an example user interface (UI) 202 for relaying a message from an initial node through an offline mesh network, in accordance with one or more implementations. In some implementations, an initial node may be a smartphone 200, or the like. Although a smartphone 200 is depicted in FIG. 2, it is contemplated that the systems and methods described herein may be implemented in laptop computers, personal computers, tablets, wearable devices, Internet of Things (IoT) devices, servers, devices operable to send digital messages, or the like. An initial node 200 may include a display operable to display a UI 202 in accordance with the present disclosure. The UI 202 may comprise a notification 204 that the initial node 200 has lost connectivity to the network. The network may include, for example, a cellular communication network, the Internet, or the like. The UI 202 may provide the option of specifying a destination node through a destination input 206. The UI 202 may include the option of sending a message through a message portal 208. The message portal 208 may accept messages for transmission to a second node. By way of example, text messages, photos, video, files, and the like may be sent via the portal 208. The UI 202 may also include an option to send the message through the portal 208 via a send or cancel option 210.

Figure 3:
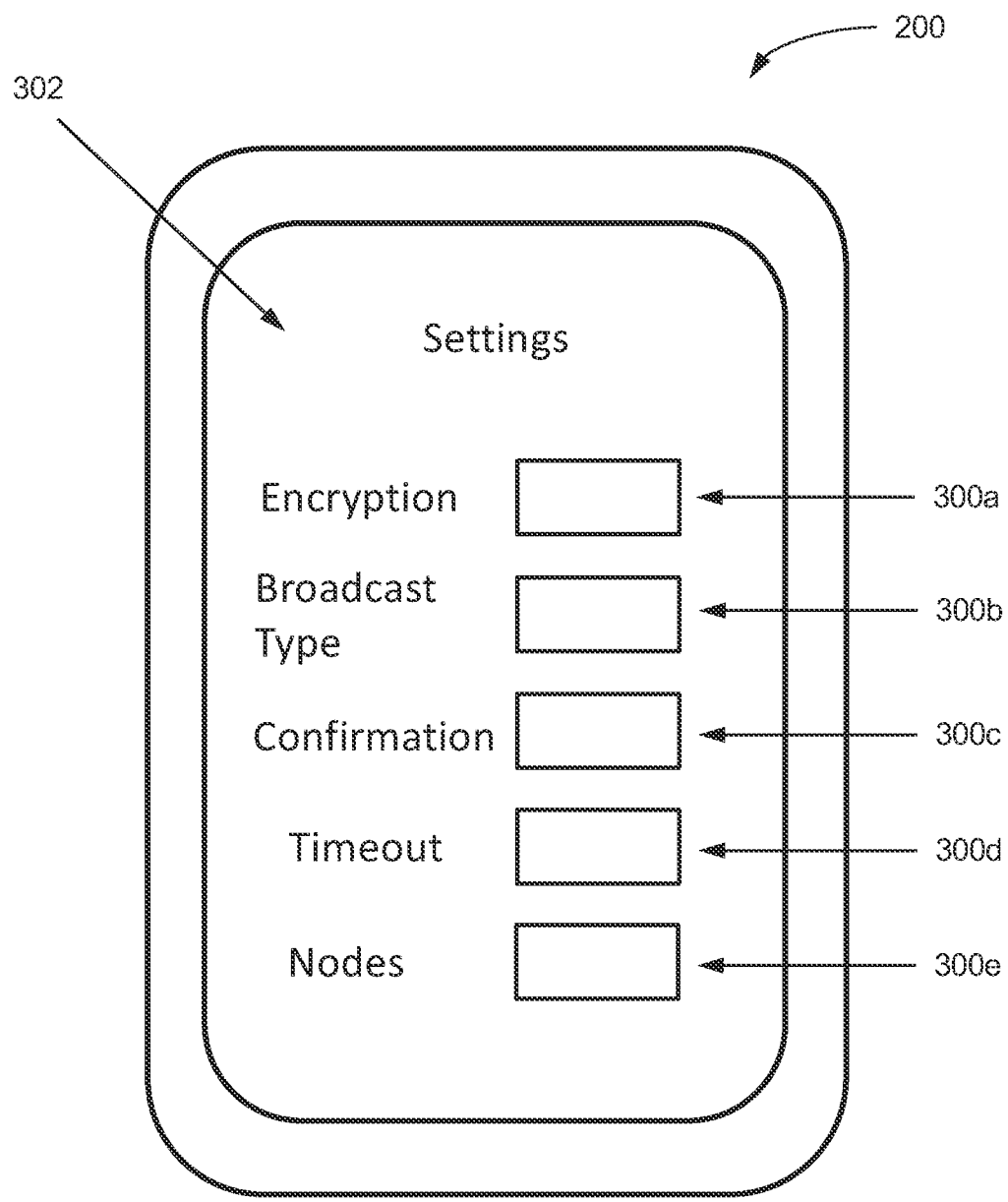
FIG. 3 illustrates an example UI for configuring an initial node for relaying a message through an offline mesh network, in accordance with one or more implementations.

FIG. 3 illustrates an example UI 302 for configuring an initial node 200 for relaying a message through an offline mesh network, in accordance with one or more implementations. In some implementations the initial node 200 may be configurable with various options 300a-e provided with a UI 302. Some options may include encryption 300a, broadcast type 300b, receipt confirmation 300c, timeout 300d, and number of nodes 300e. The encryption option 300a may include an option of whether to encrypt the message and what type of encryption to use. In some implementations, the broadcast type option 300b may include what type of transmission or transmissions to use for broadcasting the message. For example, the user may wish to broadcast the message via both bluetooth and wi-fi.

In some implementations, the receipt confirmation option 300c may include an option to request a confirmation from the destination node when the message is delivered and/or read. The timeout option 300d may allow specification of a certain time limit for the initial node and/or intermediary nodes to broadcast the message before ceasing. In some implementations, if the time limit is reached and the destination node has not received the message, the initial node may be notified, and the UI 202 may display a notification that the message was not received. The nodes option 300e may allow for the specification of a certain threshold number of nodes. In some implementations, after a threshold number of intermediary nodes have broadcast a message without reaching the destination node, the broadcasting ceases. By way of example, the threshold number of nodes may be 100.

The disclosed system(s) address a problem in traditional offline mesh network message relaying techniques tied to computer technology, namely, the technical problem of losing access to sending messages and communications when a network or devices goes offline. The disclosed system solves this technical problem by providing a solution also rooted in computer technology, namely, by providing for offline mesh messaging network with bluetooth broadcasting. The disclosed subject technology further provides improvements to the functioning of the computer itself because it improves processing and efficiency in relaying a message through an offline mesh network.

Figure 4:
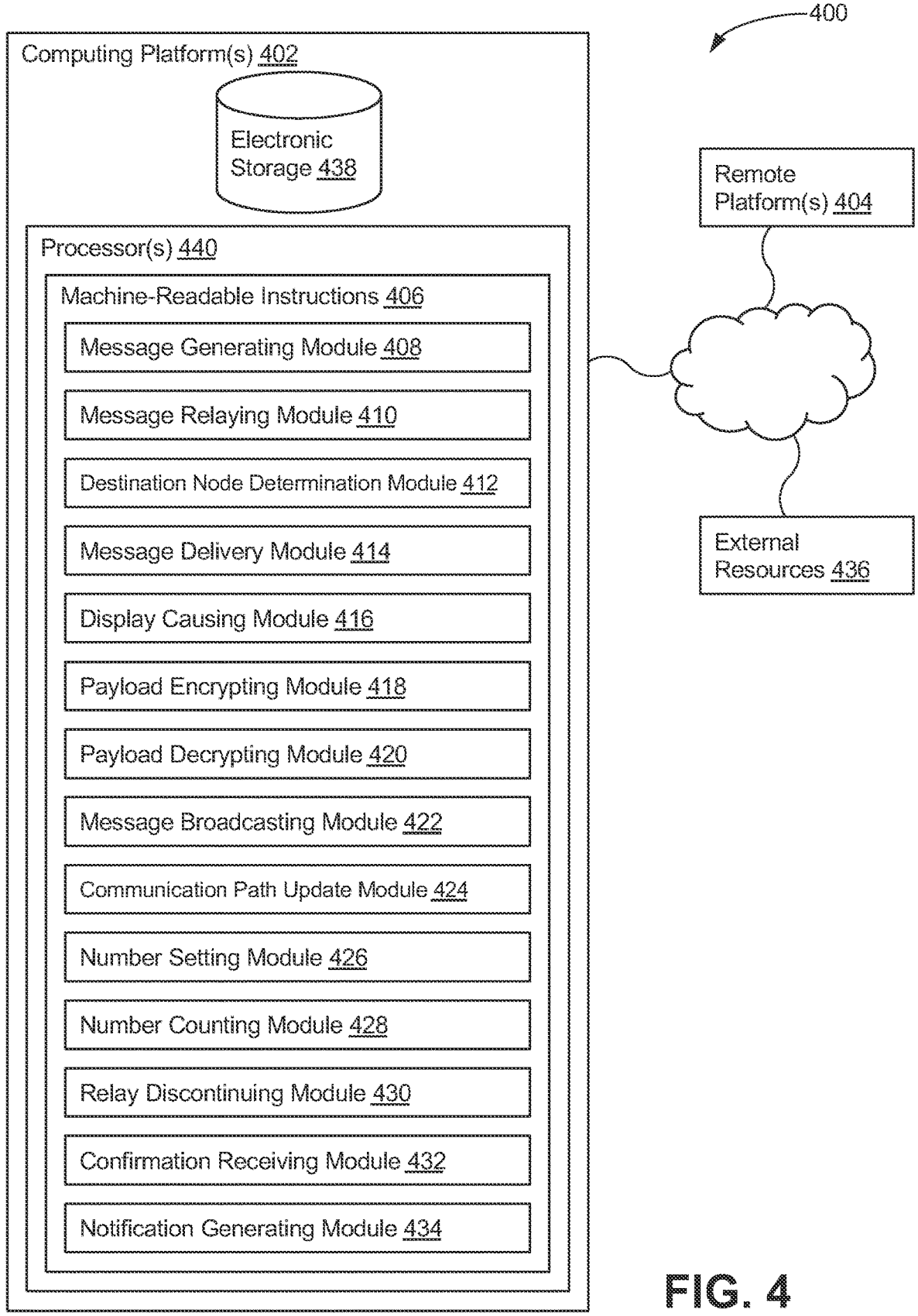
FIG. 4 illustrates a system configured for relaying a message through an offline mesh network, in accordance with one or more implementations.

FIG. 4 illustrates a system 400 configured for relaying a message through an offline mesh network, according to certain aspects of the disclosure. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of message generating module 408, message relaying module 410, destination node determination module 412, message delivery module 414, display causing module 416, payload encrypting module 418, payload decrypting module 420, message broadcasting module 422, communication path update module 424, number setting module 426, number counting module 428, relay discontinuing module 430, confirmation receiving module 432, notification generating module 434, and/or other instruction modules.

Message generating module 408 may be configured to generate, at an initial node, a message including a payload, an account identifier for the initial node, and an account identifier for the destination node. An initial node may be the node generating a message and the destination node may be a node specified at the initial node as the destination for the message. A payload may include the contents of the message or communication the initial node would like to send to the destination node. An account identifier may include account information specific to a user of the initial node, a name of the initial node, identifying information indicating the origin of a message, or the like. Nodes may comprise communication devices operable to send and receive messages wirelessly, or the like. The message may further include a communication path between the first node and the destination node. A communication path may be an identification of the nodes the message is relayed by or pass through on the way to the destination node. The payload may include contents of the message. The account identifier may include account information of an end-to-end encrypted messaging platform for a user associated with the first node. A messaging platform may be an application or portal accessible via an initial node that accepts messages and transmits/receives messages to/from a destination node. The destination node may confirm the account identifier for the initial node of the message.

Message relaying module 410 may be configured to relay the message through one or more intermediary nodes. Intermediary nodes may comprise communication devices operable to receive a broadcast message from another node and relay it to additional nodes. The message may be relayed through the one or more intermediary nodes by broadcasting it via bluetooth technology. Bluetooth is a short-range wireless communications standard. The message may be relayed through the one or more intermediary nodes by broadcasting it via wifi technology. Wi-fi is family of network protocols commonly used for local area networking of devices and Internet access, allowing nearby digital devices to exchange data by radio waves. The initial node may relay the nodes through the one or more intermediary nodes by broadcasting the message for a specified time. A specified time may comprise, for example, between 10 minutes and 60 minutes. If the message is relayed back to a node that has already relayed the message, the node may reject the message.

Destination node determination module 412 may be configured to determine, by each of the one or more intermediary nodes, whether the destination node matches any of the one or more intermediary nodes. The destination node may be connected to the Internet and receives the message via the Internet from one node of the one or more intermediary nodes that is also connected to the Internet.

Message delivery module 414 may be configured to, in response to the determining, deliver the message to the destination node. In some implementations, the destination node may filter out duplicate copies of the message relayed from different nodes. For example, if multiple different intermediary nodes send the destination node the same message, the destination node will only accept receipt of one copy of the message and will filter out all duplicate copies. Display causing module 416 may be configured to cause display of the message through the destination node. Display may include presenting the message or part of the message via a visual screen such as a smartphone screen, computer monitor, or the like.

Payload encrypting module 418 may be configured to encrypt the payload at the initial node. Payload decrypting module 420 may be configured to decrypt the payload at the destination node. Message broadcasting module 422 may be configured to broadcast, by each intermediary node, the message to nearby nodes. In some implementations, nearby may include other nodes within bluetooth communication range. For example, nearby nodes may be nodes within 20 meters, or the like.

Communication path update module 424 may be configured to update the communication path by appending an identification of each node as the message passes from one node to a next node until the message reaches the destination node. A forward path for relaying the message may do not need to be the same as a return path for a return message from the destination node to the initial node. A return path may include the nodes and communication types used to send a message from the destination node to the initial node. A return message may include a message sent from the destination node back to the initial node. Relaying may include receiving a message and re-broadcasting, re-transmitting, or forwarding the message to another node. A return path for relaying a return message from the destination node to the initial node may be the same communication path as the message from the initial node and the destination node.

Number setting module 426 may be configured to set a maximum or threshold number of intermediary nodes. A maximum or threshold number of intermediary nodes may be a specified number of nodes for re-broadcasting a message before it reaches a destination. In some implementations, if the maximum or threshold number of intermediary nodes is reached, transmission of the message will cease. The maximum number of intermediary nodes may be in a range of eighty to one hundred twenty nodes. In some implementations, the nodes may include wireless devices having wireless connectivity. Wireless connectivity may include the capability of a device to connect to other devices via wireless communications, such as through wi-fi, bluetooth, cellular communications, or the like. In some implementations, the nodes may be within a certain range of each other. A certain range may indicate a specified physical distance away from the node. In some implementations, the certain range may be a range of bluetooth communication. In some implementations, the certain range may be less than twenty meters.

Number counting module 428 may be configured to count the number of intermediary nodes that relay the message. Relay discontinuing module 430 may be configured to discontinue the relay of the message when the maximum number of intermediary nodes is reached.

Confirmation receiving module 432 may be configured to receive, at the initial node, a confirmation of receipt of the message when the message is delivered to the destination node. A confirmation of receipt may be a notification or message transmitted to or displayed by the initiating node of a message confirming that the message has successfully been delivered or opened by a destination node. Although one destination node is referred to herein, it is contemplated that multiple destination nodes or groups of destination nodes may be specified by an initial node.

Notification generating module 434 may be configured to generate a notification that the message was not received if the confirmation of receipt of the message is not received by the initial node within a specified time. The specified time may be between ten minutes and sixty minutes.

In some implementations, computing platform(s) 402, remote platform(s) 404, and/or external resources 436 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 436 may be operatively linked via some other communication media.

A given remote platform 404 may include one or more processors configured to execute computer program modules. The computer program modules may be configured to enable an expert or user associated with the given remote platform 404 to interface with system 400 and/or external resources 436, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 436 may include sources of information outside of system 400, external entities participating with system 400, and/or other resources. In some implementations, some or all of the functionality attributed herein to external resources 436 may be provided by resources included in system 400.

Computing platform(s) 402 may include electronic storage 438, one or more processors 440, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 438 may comprise non-transitory storage media that electronically stores information. The electronic storage media of electronic storage 438 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 438 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 438 may include one or more virtual storage resources (e.g., cloud storage, a virtual private network, and/or other virtual storage resources). Electronic storage 438 may store software algorithms, information determined by processor(s) 440, information received from computing platform(s) 402, information received from remote platform(s) 404, and/or other information that enables computing platform(s) 402 to function as described herein.

Processor(s) 440 may be configured to provide information processing capabilities in computing platform(s) 402. As such, processor(s) 440 may include one or more of a digital processor, an analog processor, a digital circuit designed to process information, an analog circuit designed to process information, a state machine, and/or other mechanisms for electronically processing information. Although processor(s) 440 is shown in FIG. 4 as a single entity, this is for illustrative purposes only. In some implementations, processor(s) 440 may include a plurality of processing units. These processing units may be physically located within the same device, or processor(s) 440 may represent processing functionality of a plurality of devices operating in coordination. Processor(s) 440 may be configured to execute modules 408, 410, 412, 414, 416, 418, 420, 422, 424, 426, 428, 430, 432, and/or 434, and/or other modules. Processor(s) 440 may be configured to execute modules 408, 410, 412, 414, 416, 418, 420, 422, 424, 426, 428, 430, 432, and/or 434, and/or other modules by software; hardware; firmware; some combination of software, hardware, and/or firmware; and/or other mechanisms for configuring processing capabilities on processor(s) 440. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, 422, 424, 426, 428, 430, 432, and/or 434 are illustrated in FIG. 4 as being implemented within a single processing unit, in implementations in which processor(s) 440 includes multiple processing units, one or more of modules 408, 410, 412, 414, 416, 418, 420, 422, 424, 426, 428, 430, 432, and/or 434 may be implemented remotely from the other modules. The description of the functionality provided by the different modules 408, 410, 412, 414, 416, 418, 420, 422, 424, 426, 428, 430, 432, and/or 434 described below is for illustrative purposes, and is not intended to be limiting, as any of modules 408, 410, 412, 414, 416, 418, 420, 422, 424, 426, 428, 430, 432, and/or 434 may provide more or less functionality than is described. For example, one or more of modules 408, 410, 412, 414, 416, 418, 420, 422, 424, 426, 428, 430, 432, and/or 434 may be eliminated, and some or all of its functionality may be provided by other ones of modules 408, 410, 412, 414, 416, 418, 420, 422, 424, 426, 428, 430, 432, and/or 434. As another example, processor(s) 440 may be configured to execute one or more additional modules that may perform some or all of the functionality attributed below to one of modules 408, 410, 412, 414, 416, 418, 420, 422, 424, 426, 428, 430, 432, and/or 434.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
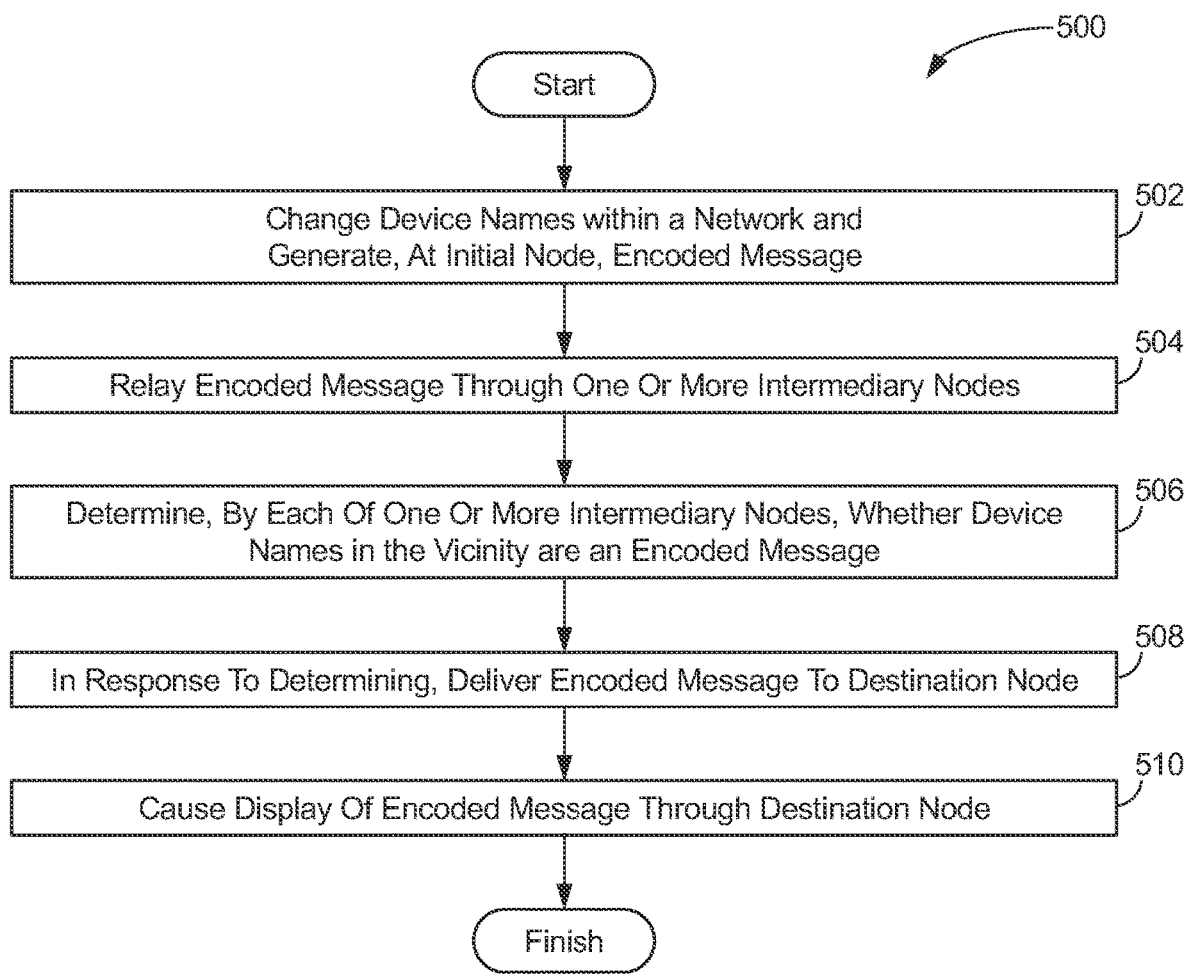
FIG. 5 illustrates an example flow diagram for relaying a message through an offline mesh network, according to certain aspects of the disclosure.

FIG. 5 illustrates an example flow diagram (e.g., process 500) for relaying a message through an offline mesh network, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, the process 500 may include generating, at an initial node, a message including a payload, an account identifier for the initial node, and an account identifier for the destination node. At step 504, the process 500 may include relaying the message through one or more intermediary nodes. At step 506, the process 500 may include determining, by each of the one or more intermediary nodes, whether the destination node matches any of the one or more intermediary nodes. At step 508, the process 500 may include in response to the determining, delivering the message to the destination node. At step 510, the process 500 may include causing display of the message through the destination node.

For example, as described above in relation to FIG. 4, at step 502, the process 500 may include generating, at an initial node, a message including a payload, an account identifier for the initial node, and an account identifier for the destination node, through message generating module 408. At step 504, the process 500 may include relaying the message through one or more intermediary nodes, through message relaying module 410. At step 506, the process 500 may include determining, by each of the one or more intermediary nodes, whether the destination node matches any of the one or more intermediary nodes, through destination node determination module 412. At step 508, the process 500 may include in response to the determining, delivering the message to the destination node, through message delivery module 414. At step 510, the process 500 may include causing display of the message through the destination node, through display causing module 416.

According to an aspect, the nodes comprise wireless devices having wireless connectivity. According to an aspect, the nodes are within a certain range of each other. (e.g., Bluetooth range). According to an aspect, a forward path for relaying the message does not need to be the same as a return path for a return message from the destination node to the initial node. According to an aspect, the account identifier comprises account information of an end-to-end encrypted messaging platform for a user associated with the first node. According to an aspect, the payload comprises contents of the message. According to an aspect, the process 500 may include encrypting the payload at the initial node. According to an aspect, the process 500 may include decrypting the payload at the destination node. According to an aspect, the process 500 may include broadcasting, by each intermediary node, the message to nearby nodes.

According to an aspect, the destination node confirms the account identifier for the initial node of the message.

Figure 6:
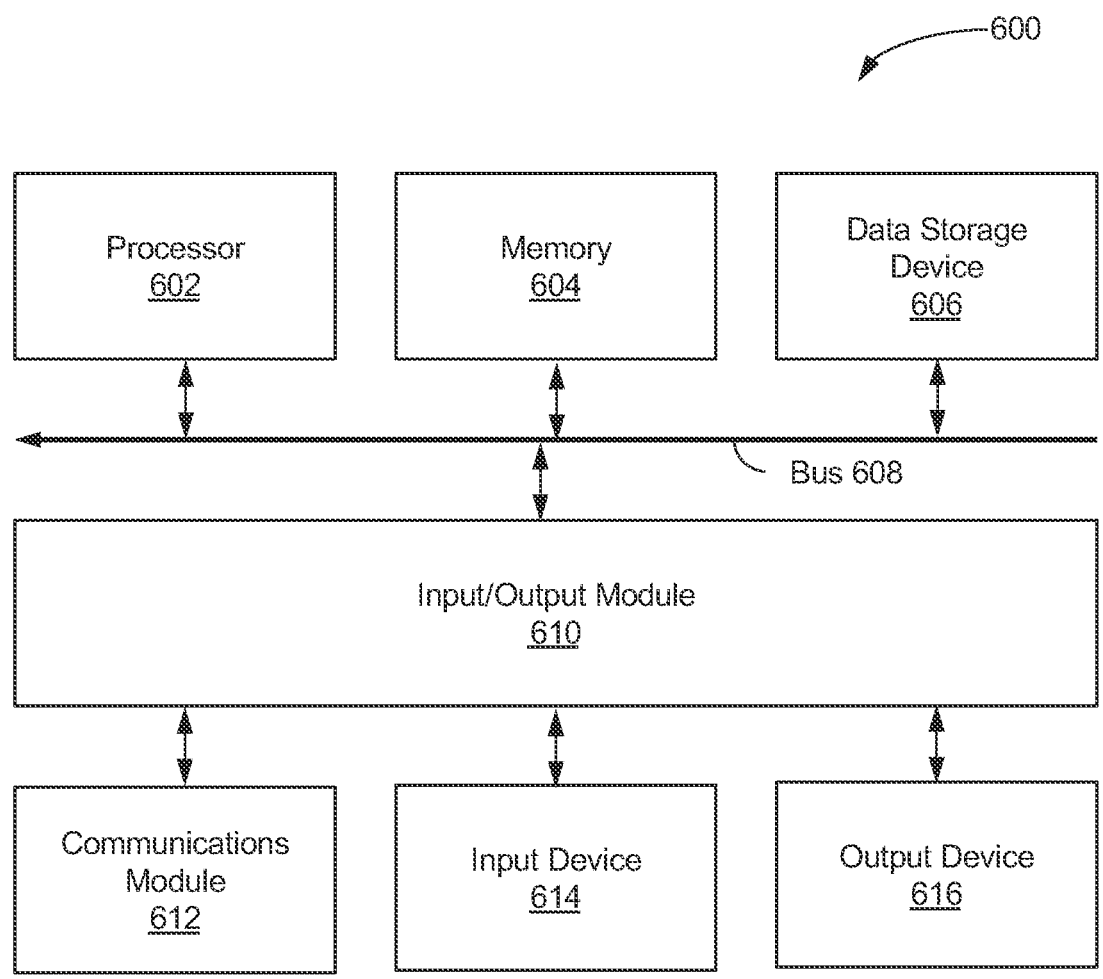
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for relaying a message through an offline mesh network, comprising:
   generating, at an initial node, a message comprising a payload, an account identifier for the initial node, and an account identifier for a destination node, wherein the initial node is an offline device in an offline mesh network:
relaying the message through one or more intermediary nodes;
determining, by each of the one or more intermediary nodes, whether the destination node matches any of the one or more intermediary nodes;
in response to determining that the destination node does not match an intermediary node, broadcasting the message from the intermediary node using a device name associated with the intermediary node until one of the intermediary nodes determines that the account identifier for the destination node matches its own identifier;
in response to determining that the destination node matches the intermediary node, delivering the message to the destination node; and
causing display of the message through the destination node.

2. The method of claim 1, wherein the one or more intermediary nodes comprise wireless devices having wireless connectivity.

3. The method of claim 1, wherein the one or more intermediary nodes are within a certain range of each other.

4. The method of claim 3, wherein the certain range is a range of bluetooth communication.

5. The method of claim 3, wherein the certain range is less than twenty meters.

6. The method of claim 1, wherein a forward path for relaying the message from the initial node to the destination node does not need to be the same as a return path for a return message from the destination node to the initial node.

7. The method of claim 1, wherein the account identifier comprises account information of an end-to-end encrypted messaging platform for a user associated with the initial node.

8. The method of claim 1, wherein the payload comprises contents of the message.

9. The method of claim 1, further comprising: encrypting the payload at the initial node.

10. The method of claim 9, further comprising: decrypting the payload at the destination node.

11. A system configured for relaying a message through an offline mesh network, the system comprising:
one or more hardware processors configured by machine-readable instructions to: generate, at an initial node, a message comprising a payload, an account identifier for the initial node, and an account identifier for a destination node, wherein the initial node is an offline device in an offline mesh network:
relay the message through one or more intermediary nodes via bluetooth technology;
determine, by each of the one or more intermediary nodes, whether the destination node matches any of the one or more intermediary nodes;
in response to determining that the destination node does not match an intermediary node, broadcast the message from the intermediary node using a device name associated with the intermediary node until one of the intermediary nodes determines that the account identifier for the destination node matches its own identifier;
in response to determining that the destination node matches the intermediary node, deliver the message to the destination node; and
cause display of the message through the destination node.

12. The system of claim 11, wherein the one or more intermediary nodes comprise wireless devices having wireless connectivity.

13. The system of claim 11, wherein the one or more intermediary nodes are within a certain range of each other.

14. The system of claim 13, wherein the certain range is a range of bluetooth communication.

15. The system of claim 13, wherein the certain range is less than twenty meters.

16. The system of claim 11, wherein a forward path for relaying the message from the initial node to the destination node does not need to be the same as a return path for a return message from the destination node to the initial node.

17. The system of claim 11, wherein the account identifier comprises account information of an end-to-end encrypted messaging platform for a user associated with the initial node.

18. The system of claim 11, wherein the payload comprises contents of the message.

19. The system of claim 11, wherein the one or more hardware processors are further configured by machine-readable instructions to:
encrypt the payload at the initial node; and
decrypt the payload at the destination node.

20. A non-transient computer-readable storage medium having instructions embodied thereon, the instructions being executable by one or more processors to perform a method for relaying a message through an offline mesh network, the method comprising:
generating, at an initial node, a message comprising a payload, an account identifier for the initial node, and an account identifier for a destination node, wherein the initial node is an offline device in an offline mesh network;
relaying the message through one or more intermediary nodes via bluetooth technology;
determining, by each of the one or more intermediary nodes, whether the destination node matches any of the one or more intermediary nodes;
in response to determining that the destination node does not match an intermediary node, broadcasting the message from the intermediary node using a device name associated with the intermediary node until one of the intermediary nodes determines that the account identifier for the destination node matches its own identifier;
in response to determining that the destination node matches the intermediary node, delivering the message to the destination node; and
causing display of the message through the destination node.

* * * * *